(No Model.)
L. C. HUNTER.
FARM GATE.
No. 391,746. Patented Oct. 23, 1888.
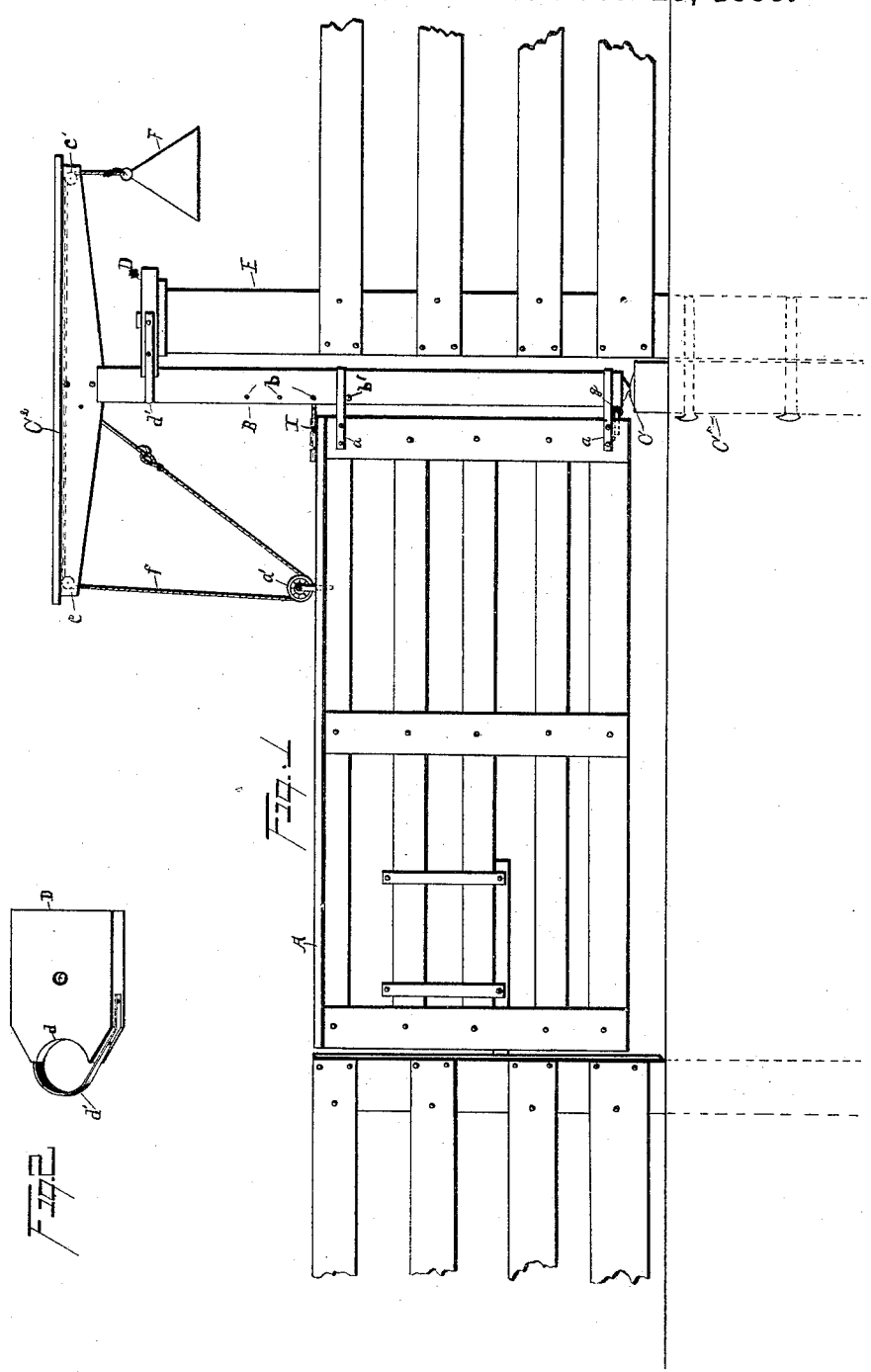
WITNESSES,
B. S. Lowrie.
Geo. W. King.
Lewis C. Hunter INVENTOR.
By
Liggett & Liggett Attorneys.

UNITED STATES PATENT OFFICE.

LEWIS C. HUNTER, OF FORT WAYNE, INDIANA.

FARM-GATE.

SPECIFICATION forming part of Letters Patent No. 391,746, dated October 23, 1888.

Application filed April 30, 1888. Serial No. 272,329. (No model.)

*To all whom it may concern:*

Be it known that I, LEWIS C. HUNTER, of Fort Wayne, in the county of Allen and State of Indiana, have invented certain new and useful Improvements in Farm-Gates; and I do hereby declare the following to be a full, clear, and exact description of the invention, such as will enable others skilled in the art to which it pertains to make and use the same.

My invention relates to improvements in farm-gates; and it consists in certain features of construction and in combinations of parts hereinafter described, and pointed out in the claims.

In the accompanying drawings, Figure 1 is a side elevation. Fig. 2 is a plan in detail, hereinafter described.

A represents the gate, that in the main may be of ordinary construction. The gate is provided with clamps or bands $a$, rigidly secured to the rear end and near the top and bottom thereof, as shown, these bands embracing loosely standard B. This standard at the bottom is pivoted on a suitable stepping, C, and above has a rounded section that fits loosely in a box, the latter consisting preferably of a block of wood, D, having a semicircular seat, $d$, and a band, $d'$, the latter being secured to the block substantially as shown in Fig. 2, this box being rigidly secured to post E. Standard B at the top end has rigidly attached a cross-bar, $C^2$, the latter having mounted thereon sheaves $c$ and $c'$. The gate is provided with a sheave, $a'$, located substantially as shown. A cord or cable, $f$, is attached to the cross-bar, for instance, as shown. This cord leads under sheave $a'$ and leads over sheaves $c$ and $c'$, and has attached to the free end thereof a poise, F. This poise so nearly counterbalances the weight of the gate that the latter may easily be raised by hand, the bands $a$ sliding along the standard while the gate is being adjusted vertically. A friction-roller, $g$, is connected with the gate near the lower side thereof, and this roller travels on the adjacent face of the standard, to prevent clamps $a$ from cramping on the standard in raising and lowering the gate. A series of holes, $b$, are made in the standard, and a pin, $b'$, is provided, that may be inserted in any one of these holes, such pin being placed below the upper clamp, $a$, for holding the gate at the desired elevation. The gate may be raised or lowered as occasion may require. For instance, the gate may be raised to swing over deep snow or to admit the passage of small animals under the gate.

The block $C'$, that supports stepping C, had better be secured to post E, which may easily be done before the post and block are set in the ground.

From the location of sheave $a'$ toward the rearward end of the gate it is evident that the operator in raising the gate should apply his force near the forward end thereof, and when the gate is left free the front end will sag a trifle—just enough to tighten the upper clamp, $a$, on the standard—by reason of which the gate and standard turn together as steadily as if they were rigidly connected. The different holes $b$ are made at different elevations in view of giving the necessary elevation to the gate for different purposes. Sometimes animals in attempting to pass under the gate will raise the latter, and to prevent this a locking-bolt, I, is secured to the gate in the position shown, the bolt entering holes (not shown) made in the face of the standard.

With the construction shown, the weight of the gate being supported in the main by the stepping, and the stepping and box D being widely separated, the gate will turn easily, and the pivotal bearings without repairs are likely to last as long as the gate.

What I claim is—

1. In a farm-gate, the combination, with a standard having pivotal bearings, so as to turn on its axis, of a gate mounted on such standard and adapted to turn with and slide endwise of the standard, a cross-bar connected with the standard, sheaves mounted on the cross-bar, a cable, and a poise, arranged substantially as indicated, for counterbalancing the gate, substantially as set forth.

2. In a farm-gate, the combination, with a standard adapted to turn on its axis, said standard being supported by means of a stationary post and stepping, substantially as indicated, of a gate having clasps or bands attached thereto for embracing such standard, so that the gate may be adjusted vertically and turn with the standard, a cross-bar connected with the standard, sheaves, a cable, and a poise, arranged substantially as indicated, for counterbalancing the gate, the parts being arranged substantially as set forth.

3. In a farm-gate, the combination, with a standard adapted to turn on its axis, said standard having a cross-bar attached to the upper end thereof and having a series of holes at different elevations, and sheaves, cable, and weight, arranged substantially as described, for counterbalancing the gate, of a gate mounted on such standard so as to turn with and slide endwise of the standard, a pin interchangeable in the holes of the standard for engaging the gate attachments and holding the gate at the desired elevation, a friction-roller connected with the rear lower corner of the gate for traveling on the face of the standard, and a locking-bolt connected with the gate for engaging holes in the standard to prevent the gate from being lifted, the parts being arranged substantially as set forth.

In testimony whereof I sign this specification, in the presence of two witnesses, this 19th day of January, 1888.

LEWIS C. HUNTER.

Witnesses:
ISAAC MOWRER,
THOMAS GREER, Jr.